US008576110B2

(12) United States Patent
Valentine

(10) Patent No.: US 8,576,110 B2
(45) Date of Patent: Nov. 5, 2013

(54) FAST RAY TRACE TO IDENTIFY RADAR MULTIPATHS

(75) Inventor: Mark L. Valentine, West Hills, CA (US)

(73) Assignee: Raytheon Company, Waltham, MA (US)

( * ) Notice: Subject to any disclaimer, the term of this patent is extended or adjusted under 35 U.S.C. 154(b) by 127 days.

(21) Appl. No.: 13/178,204

(22) Filed: Jul. 7, 2011

(65) Prior Publication Data

US 2013/0009804 A1 Jan. 10, 2013

(51) Int. Cl.
*G01S 13/00* (2006.01)
(52) U.S. Cl.
USPC ............. 342/22; 342/27; 342/28; 342/160; 342/195

(58) Field of Classification Search
USPC ................... 342/22, 27, 28, 160, 195
See application file for complete search history.

(56) References Cited

U.S. PATENT DOCUMENTS

| 7,515,098 | B1* | 4/2009 | Garren et al. ............... 342/179 |
| 7,966,147 | B2* | 6/2011 | Jennings et al. ............. 702/159 |
| 7,973,716 | B2* | 7/2011 | Elwell et al. ................ 342/453 |
| 7,978,124 | B2* | 7/2011 | Cook et al. .................. 342/160 |
| 2009/0102707 | A1* | 4/2009 | Elwell et al. ............ 342/357.01 |
| 2011/0025494 | A1 | 2/2011 | Adcook et al. |
| 2011/0025546 | A1* | 2/2011 | Cook et al. ................... 342/22 |
| 2011/0075516 | A1* | 3/2011 | Xia et al. ..................... 367/53 |
| 2012/0075162 | A1 | 3/2012 | Livingston et al. |

OTHER PUBLICATIONS

Setlur, Pawan; Amin, Moeness; Ahmad, Fauzia; , "Multipath model and exploitation in through-the-wall radar and urban sensing," Acoustics, Speech and Signal Processing (ICASSP), 2011 IEEE International Conference on , vol., No., pp. 2676-2679, May 22-27, 2011.*
Setlur, P.; Amin, M.; Ahmad, F., "Multipath model and exploitation in through-the-wall radar and urban sensing," Acoustics, Speech and Signal Processing (ICASSP), 2011 IEEE International Conference on , vol., No., pp. 2676,2679, May 22-27, 2011.*
Setlur, P.; Amin, M.; Ahmad, F., "Multipath Model and Exploitation in Through-the-Wall and Urban Radar Sensing," Geoscience and Remote Sensing, IEEE Transactions on , vol. 49, No. 10, pp. 4021,4034, Oct. 2011.*
Extended European Search Report for European Application No. 12166395.9, Extended European Search Report dated Oct. 11, 2012 and mailed Oct. 18, 2012 (10 pgs.).

(Continued)

*Primary Examiner* — John B Sotomayor
*Assistant Examiner* — Marcus Windrich
(74) *Attorney, Agent, or Firm* — Christie, Parker & Hale, LLP

(57) ABSTRACT

A method of detecting a target in a room using a radar system having a transmitter for irradiating the object, a sensor for receiving reflected radiation, and circuitry for analyzing the reflected radiation to determine at least one characteristic thereof, the method including determining at least one parameter for each wall of a plurality of walls of a room containing the target; determining possible signal paths between the target and the sensor for paths including up to N reflections based on the at least one parameter of each wall and the location of the sensor; calculating target image locations based on the possible signal paths; and processing the received radiation to determine a target location based on target image locations.

15 Claims, 20 Drawing Sheets

(56) References Cited

OTHER PUBLICATIONS

Pawan Setlur, et al., "Target Localization With a Single-Antenna Monostatic Radar Via Multipath Exploitation", Proceedings of SPIE, Apr. 24, 2011, vol. 8021 (pp. 80210J-1-80210-J12).

Traian Dogaru, et al., "Synthetic Aperture Radar Images of a Simple Room Based on Computer Models", ARL-TR-5193, May 2010, (62 pgs.).

Pawan Setlur, et al., "Multipath Model and Exploitation in Through-The-Wall Radar and Urban Sensing", ICASSP, 2011 IEEE International Conference, (pp. 2676-2679).

Traian Dogaru, et al., "SAR Images of Rooms and Buildings Based on FDTD Computer Models", IEEE Transactions on Geoscience and Remote Sensing, IEEE Service Center, Piscataway, NJ, US., vol. 47, No. 5, May 1, 2009 (pp. 1388-1401).

Pawan Setlur, et al., "Multipath Model and Exploitation in Through-The Wall and Urban Radar Sensing", IEEE Transactions on Geoscience and Remote Sensing, IEEE Service Center, Piscataway, NJ, US., vol. 49, No. 10, May 4, 2011 (pp. 4021-4034).

Guillaume de la Roche, et al., "On Predicting In-Building WiFi Coverage With a Fast Discrete Approach," Int. J. Mobile Network Design and Innovation, vol. 2, No. 1, 2007 (pp. 3-12).

Dennis M. Hancock, "3D Modeling for Multipath Exploitation Radar," mhtml:file://C:\Documents and Settings\nmd\Local Settings\Temporary Internet Files\OKL . . . , downloaded Feb. 9, 2011 (7 pages.).

Dr. Boaz ben-Moshe, et al., ,,Radio Frequency MultiPath, mhtml:file://C:\Documents and Settings\nmd\Local Settings\Temporary Internet Files\OKL . . . , downloaded Feb. 9, 2011 (2 pages.).

\* cited by examiner

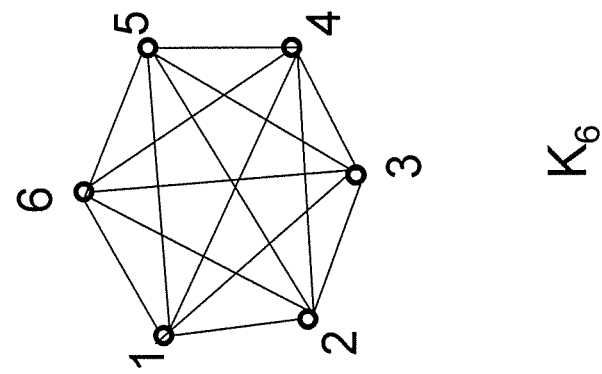
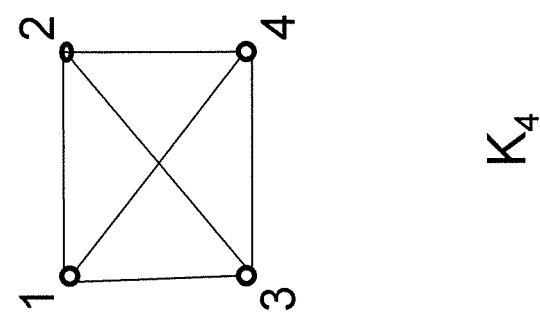
FIG. 12

FAST RAY TRACE TO IDENTIFY RADAR MULTIPATHS

STATEMENT REGARDING FEDERALLY SPONSORED RESEARCH OR DEVELOPMENT

This invention disclosure is related to U.S. Government contract number H94003-04-D-06. The U.S. Government has certain rights in this invention.

FIELD

The present invention relates to radar detection, and more particularly to a method for identifying possible ray paths for use in target location determination.

BACKGROUND

In radar systems, an electromagnetic wave may propagate radially outwards from a transmitter over a continuum of azimuth values. Reflection occurs when a ray encounters a surface (e.g., a side of a building or a target) and leaves the surface in a different direction, in which the angle of incidence equals the angle of reflection. For simplicity, all rays are taken to lie in two horizontal dimensions x and y, with all reflecting surfaces perpendicular to the x-y plane. The azimuth of a Cartesian vector $(r_x, r_y)$ is defined to be equal to $\sin^{-1}(r_x/\sqrt{r_x^2+r_y^2})$. Without this simplification, the claims herein are readily extensible to ray traces in three dimensions with the inclusion of an elevation angle. Here, the electromagnetic waves traveling from a transmitter and arriving at a point in space (e.g., a sensor) may have traveled along multiple different ray paths. Since rays emanating from a transmitter at a given time may have taken different paths, the rays may arrive at the sensor at different points in time, with different amplitudes, and/or with different angles of arrival.

The multipath rays emanating from a transmitter and reflecting from a target may reach the target directly or after one or more reflections. Further, multipath rays reflecting from a target and arriving at a sensor may reach the sensor directly or after one or more reflections. Reflected rays include those rays that have undergone one or more reflections off vertical surfaces (e.g., sides of buildings) along their paths from transmitter to target and then from target to sensor.

Sense Through the Wall (STTW) radar performance for moving target detection and location is limited by the severe multipath environment found in urban structures. Subsequently, a wide range of applications that could benefit from improved target location techniques, such as emergency services, tracking people, and military environments.

SUMMARY

The present invention relates to radar detection, and more particularly to a method for identifying possible multipaths for use in target location determination. The method recursively identifies possible paths from simpler ones, starting with the direct path from the sensor to the target, and exploits time-reversal symmetry to facilitate the calculation, so that it can be executed fast enough to implement real time in a multi-hypothesis tracker (MHT).

An embodiment of the present invention provides a method of detecting a target in a room using a radar system having a transmitter for irradiating the object, a sensor for receiving reflected radiation, and circuitry for analyzing the reflected radiation to determine at least one characteristic thereof. The method includes determining at least one parameter for each wall of a plurality of walls of a room containing the target, and determining possible signal paths between the target and the sensor for paths including up to N reflections based on the at least one parameter of the walls and the location of the sensor. The method also includes calculating sensor image locations based on the possible signal paths, and processing the received radiation to determine a target location based on the sensor image locations.

The determining the possible signal paths may further include determining a first set of possible signal paths from the target to the sensor; determining a second set of time-reversed possible signal paths from the sensor to the target; determining a union of the first set and the second set; and determining the possible two-way signal paths based on the union.

The calculating of the sensor image locations may further include calculating the azimuth angle and the range of the sensor image location. The at least one parameter may include the dimensions of each wall of the plurality of walls. The edges of each wall of the plurality of walls may be field stops.

The determining the possible signal paths may further include determining a first set of possible signal paths from the target to the sensor; determining a second set of time-reversed possible signal paths from the sensor to the target; determining an intersection of the first set and the second set; and determining the possible two-way signal paths based on the intersection.

The determining the possible signal paths may further include determining a first set of possible signal paths from the target to the sensor; determining a second set of time-reversed possible signal paths from the sensor to the target; determining an intersection of the first set and the second set; determining a union of the first set and the second set; determining a symmetric difference of the union and the intersection; and determining the possible two-way signal paths based on the possible signal paths in the intersection and the symmetric difference, wherein invalid possible signal paths are removed from the symmetric difference.

The processing the received radiation to determine a target location based on sensor image locations may include calculating an H matrix. The method may be performed by a multi-hypothesis tracker.

Another embodiment of the present invention provides a method of detecting a target in a room using a radar system having a transmitter for irradiating the object, a sensor for receiving reflected radiation, and circuitry for analyzing the reflected radiation to determine at least one characteristic thereof. The method includes determining at least one parameter for each wall of a plurality of walls of a room containing the target, determining at least one parameter for a back wall, wherein the sensor is between the room containing the target and the back wall, and determining possible signal paths between the target and the sensor for paths comprising up to N reflections based on the at least one parameter of all of the walls and the location of the sensor. The method also includes calculating sensor image locations based on the possible signal paths, and processing the received radiation to determine a target location based on the sensor image locations.

The determining the possible signal paths may further include determining a first set of possible signal paths from the target to the sensor; determining a second set of time-reversed possible signal paths from the sensor to the target; determining a union of the first set and the second set; and determining the possible two-way signal paths based on the union.

The calculating of the sensor image locations may further include calculating the azimuth angle and the range of the sensor image location. The at least one parameter may include the dimensions of each wall of the plurality of walls. The edges of each wall of the plurality of walls may be field stops.

The determining the possible signal paths may further include determining a first set of possible signal paths from the target to the sensor; determining a second set of time-reversed possible signal paths from the sensor to the target; determining an intersection of the first set and the second set; and determining the possible two-way signal paths based on the intersection.

The determining the possible signal paths may further include determining a first set of possible signal paths from the target to the sensor; determining a second set of time-reversed possible signal paths from the sensor to the target; determining an intersection of the first set and the second set; determining a union of the first set and the second set; determining a symmetric difference of the union and the intersection; and determining the possible two-way signal paths based on the possible signal paths in the intersection and the symmetric difference, wherein invalid possible signal paths are removed from the symmetric difference.

The processing the received radiation to determine a target location based on sensor image locations may include calculating an H matrix. The method may be performed by a multi-hypothesis tracker.

BRIEF DESCRIPTION OF THE DRAWINGS

FIG. 12 illustrates the complete graphs with 4, and 6 nodes, designated as $K_4$ and $K_6$, respectively.

DETAILED DESCRIPTION

The method of the present invention identifies possible multipaths based upon a target location, and more specifically this method efficiently locates specular reflections within any general structure which can be represented in two horizontal x-y dimensions. Further, the present invention allows for efficient ray-traces of a complex physical structure of known layout. The information determined by the method of the present invention may improve probability of detection of a target and or false alarm rate (e.g., up to 50% improvement). Applications for this method include battery operated handheld devices that require efficient implementation of a real-time ray-tracing algorithm that exploits building layout data and predicts multipath returns based on hypothesized target locations.

The method of the present invention assumes a monostatic configuration, i.e. that the radar transmitter and receiver (sensor) are collocated. The method of the present invention searches through the set of possible two-way paths that is obtained from the product set of all pairs of possible one-way paths with itself, under the assumption that the constituent one-way paths are independent of each other. Each two-way multipath assumes only one reflection off the target. Depending upon the non-stationary target's orientation and the angles of incidence, different return paths might be favored over others, and might be predicted statistically. However, the herein model does not attempt to determine the likelihood of any given return path, only whether it is possible. A return path from the target to the sensor is considered possible if the geometrical configuration allows it. The calculated multipaths provide enough information to determine the Jacobian (i.e., Kalman filter H-matrix) which could be used by an MHT.

Figure 1:
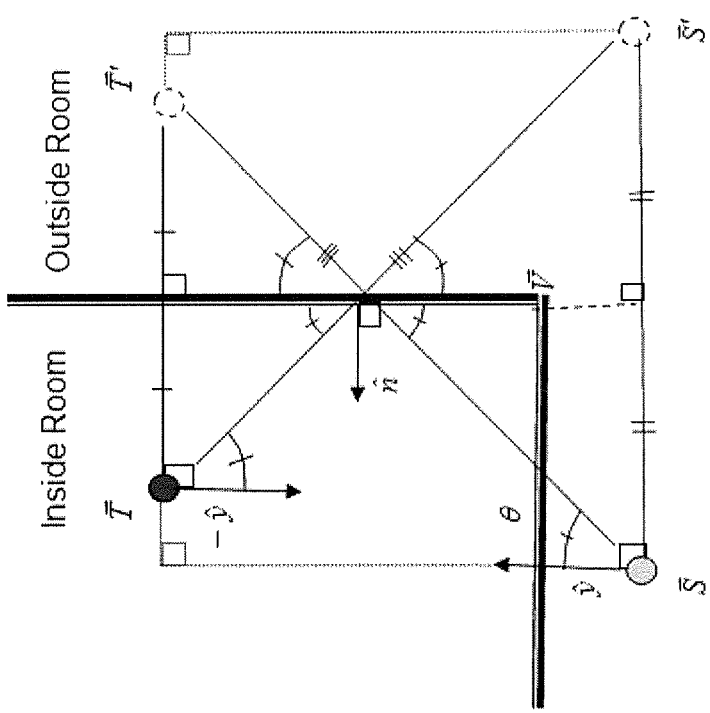
FIG. 1 illustrates example locations of a sensor and a target according to an embodiment of the present invention.

FIG. 1 shows example locations of a sensor and a target. The vectors $\vec{T}$, $\vec{S}$ and $\vec{V}$, respectively, represent the target location, the sensor location, and a point on the reflecting surface, conveniently taken as an endpoint. $\vec{T}'$ and $\vec{S}'$ respectively represent the image of the target location and the image of the sensor location. All vectors are in the two dimensions of the horizontal plane, designated by Cartesian coordinates x and y. The inside normal to the reflecting surfaces is designated by $\hat{n}$. The angle $\theta$ is the azimuth angle of the target image as seen from the sensor perspective.

The images of the sensor ($\vec{S}'$) and of the target ($\vec{T}'$) are located by extending the incident or reflected rays by an equal length, instead of reflecting them off the wall to the target $\vec{T}$. Congruent segments or angles have the same number of tick marks.

Here, three equalities hold:

$$|(\vec{T}-\vec{V})\cdot\hat{n}|=|(\vec{T}'-\vec{V})\cdot\hat{n}| \ |(\vec{S}-\vec{V})\cdot\hat{n}|=|(\vec{S}'-\vec{V})\cdot\hat{n}| \ |(\vec{S}-\vec{T})\times\hat{n}|=|(\vec{S}'-\vec{T}')\times\hat{n}|$$

The path length of the multipath, designated by P, is the same regardless of whether $\vec{T}'$ is viewed the perspective of $\vec{S}$, or whether $\vec{S}'$ is viewed from the perspective of $\vec{T}$.

$$P=|\vec{S}-\vec{T}'|=|\vec{T}-\vec{S}'|$$

Figure 2:
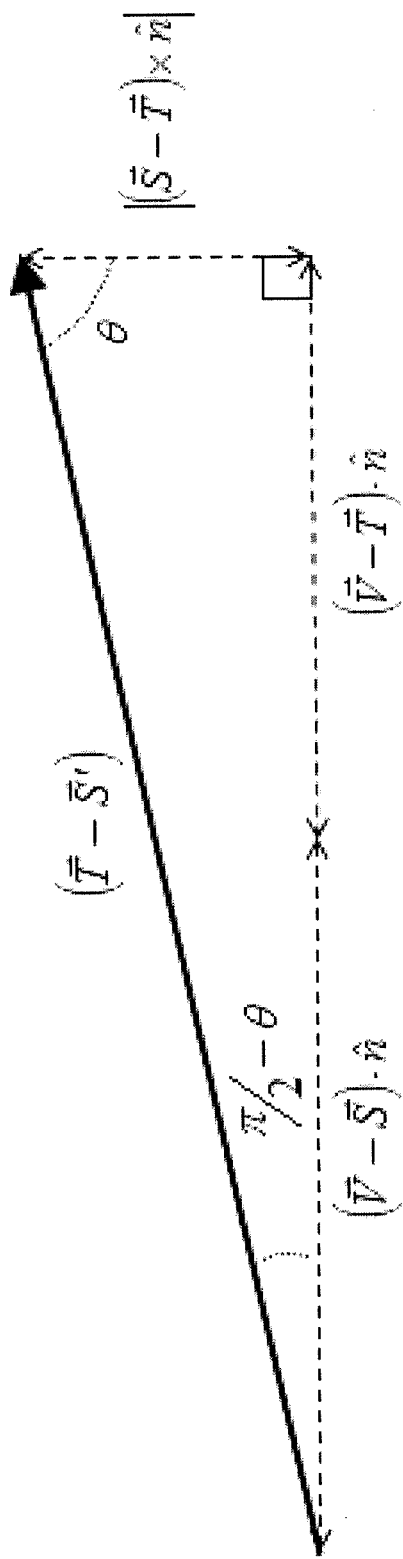
FIG. 2 illustrates an example of a right triangle with the path length as hypotenuse from a target perspective.
Figure 3:
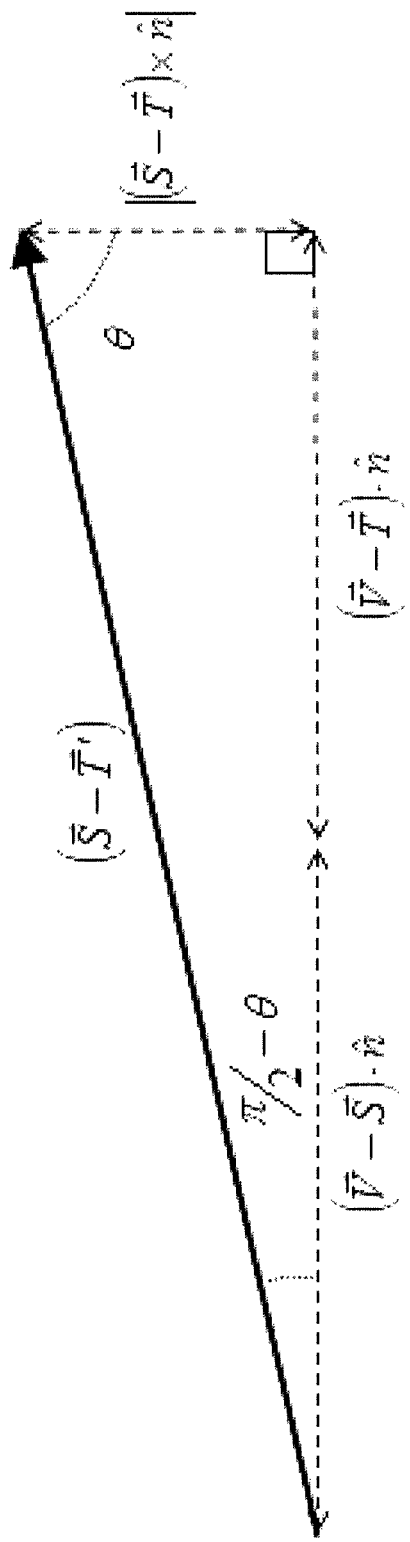
FIG. 3 illustrates an example of a right triangle with the path length as hypotenuse from a sensor perspective.

FIG. 1 shows both the target and sensor perspective, each of which is represented by a right triangle, with a hypotenuse being equal to the path length P. By substituting congruent segments, the legs of the triangles can be written in terms of surface endpoint location, a surface normal vector, and target and sensor locations. A resulting right triangle from a target perspective is shown in FIG. 2. An equivalent triangle from a sensor perspective is shown in FIG. 3.

Figure 4:
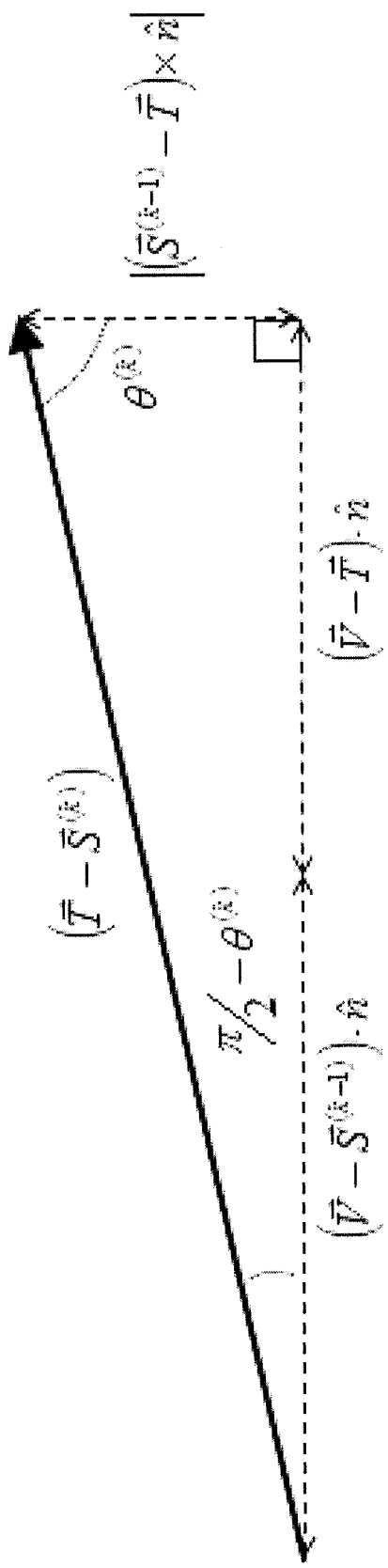
FIG. 4 illustrates an example of a right triangle for recursively producing multiple reflections from the target perspective.
Figure 5:
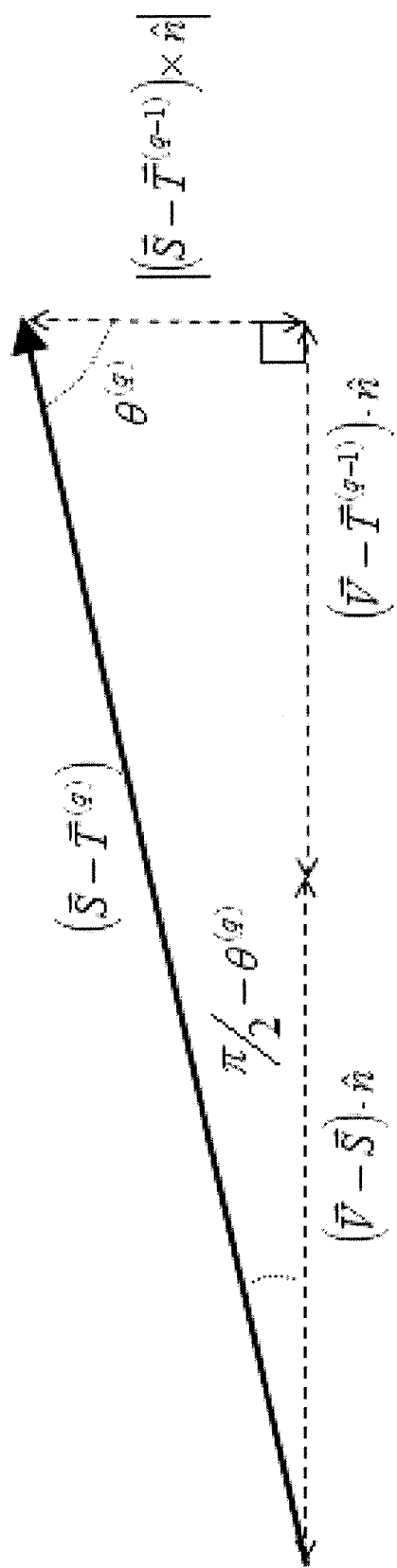
FIG. 5 illustrates an example of a right triangle for recursively producing multiple reflections from the sensor perspective.

Multiple reflections are produced by sequentially imaging the $(k-1)^{th}$ sensor reflection as the object of the $k^{th}$ reflection, which is shown in FIG. 4 from the perspective of the target. Multiple reflections produced by sequentially imaging the $(q-1)^{th}$ target reflection as the object of the $q^{th}$ reflection is shown in FIG. 5 from the perspective of the sensor. Different indices k and q are used here for the target and sensor perspectives, respectively, because the associated sequences of reflections are ordered differently depending upon whether the target or sensor perspective is used. The two sequences representing the same reflection sequence are time reversed from each other, hence the order is reversed.

In an embodiment of the present invention, the physical structure is viewed as consisting of planar one-sided semi-transparent mirrors, each of which has a unique positive integer index, with the target designated by a placeholder, e.g. 0. Each multipath is uniquely defined by a sequence of counting numbers that defines the ray path. For the sake of uniqueness all surfaces can reflect only on one side. In order to allow reflection off the opposite side, a second index must be assigned, so that two-side reflecting surfaces consist of two opposing one-sided surfaces. Two coplanar surfaces must be numbered separately, and coplanar surfaces with the same surface normal direction must be disjoint.

Figure 6:
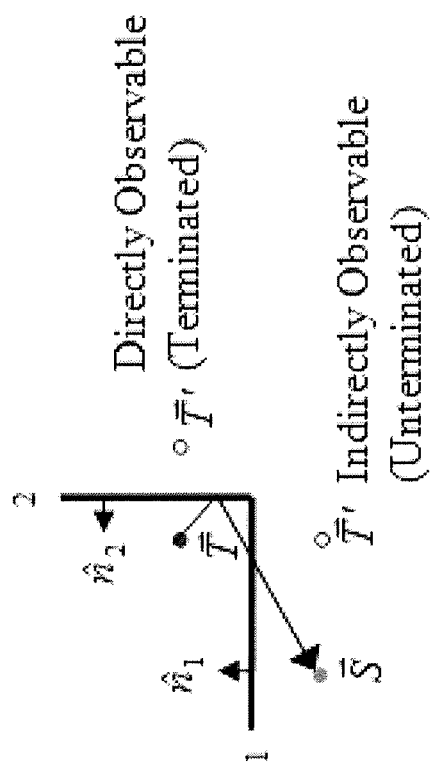
FIG. 6 illustrates the difference between terminated and unterminated paths.
Figure 7:
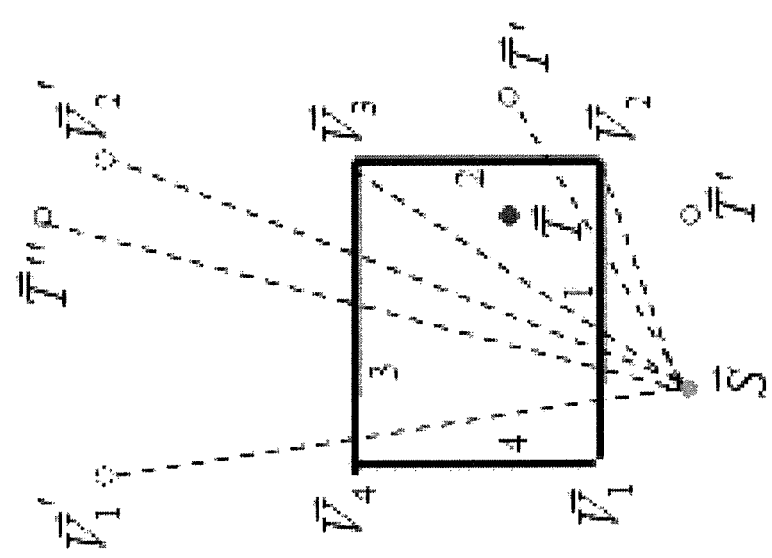
FIG. 7 illustrates how to determine field stop locations from endpoints of the reflecting surfaces projected onto the horizontal plane, and images of endpoints.

FIG. 6 shows reflected images $\vec{T}'$ of a target $\vec{T}$ as viewed from the sensor position $\vec{S}$. The surface normal vectors $\hat{n}_1$, and $\hat{n}_2$ of reflecting surfaces 1 and 2 respectively, are shown as well. The target image at locations $\vec{T}'$ is directly observable from the sensor perspective for a reflection of $\vec{T}$ off surface 2, but only indirectly observable for a reflection of $\vec{T}$ off surface 1. The sensor cannot directly see the reflection off the plane of surface 1 because $\vec{S}$ and $\vec{T}$ lie on opposite sides of the reflecting surface so there is no direct ray path between them. Such paths are designated herein as unterminated because they do not terminate at the other end, which in this case is the sensor. However, a new reflection added to the sequence might make the reflection visible to the sensor as is shown in FIG. 7. In other words, an unterminated path can generate a terminated path.

In the scenario shown in FIG. 7, some multiple reflections are impossible because the walls are bounded at the corners, thus restricting the field of view. At the first reflection, a ray must strike a wall within the interval between its endpoints. For a general $m^{th}$ side bounded by endpoints $\vec{V}_n$ and $\vec{V}_{n+1}$, an incident ray must strike the wall within an interval bounded by $\phi_n$ and $\phi_{n+1}$, with $\phi$ being the azimuth angle of each endpoint. The following defines the azimuth angle $\phi_n$ associated with the $n^{th}$ endpoint from the viewpoint perspective of the sensor:

$$\sin\phi_n \equiv \frac{(\vec{V}_n - \vec{S})\cdot\hat{x}}{|\vec{V}_n - \vec{S}|}$$

In order to be visible to the sensor, the target azimuth must fall within the bounded interval $(\phi_L, \phi_R)$ with the requirement $\phi_R > \phi_L$ for a non-null interval. ($\phi_R \leq \phi_L \Rightarrow (\phi_L, \phi_R) = \{\ \}$.) Here $\phi_L$ is the left-most, i.e. counterclockwise-most angle limiting the field of view, and $\phi_R$ is the right-most angle, and azimuth increases in value with a clockwise rotation. The condition $\phi_L < \theta < \phi_R$ with $\theta$ being the azimuth of the reflected image is necessary and sufficient for that image to fall within the field of view.

FIG. 7 illustrates how the endpoints of each reflecting surface serve as field stops in determining whether the image of a reflection sequence lies within the field of view. By way of example we evaluate field stops from the sensor perspective. However, an equivalent analysis can be done from the target perspective, as well. This example considers reflections off the inside surfaces of a four wall structure, with endpoints labeled $\vec{V}_1$ to $\vec{V}_4$, and surfaces labeled 1 to 4. Reflected images are designated with a prime. As with FIG. 6, two different points are labeled by the symbol $\vec{T}'$ because two different target reflection sequences are illustrated in the figure. First consider a target reflection off the plane of surface 2, which has endpoints at $\vec{V}_2$ and $\vec{V}_3$. That image is observable by the sensor because the vector from the sensor to the target reflection $\vec{T}'-\vec{S}$ falls within the angular subtense formed by the vectors $\vec{V}_2-\vec{S}$ and $\vec{V}_3-\vec{S}$. The points $\vec{V}_2$ and $\vec{V}_3$ serve as field stops for that reflection.

With each successive reflection, an interval between new endpoints must be intersected with an image of the previous intersection. As the allowed subtense gets narrower, some sequences of reflections become impossible because either the target image viewed from the sensor position has an azimuth angle that lies outside the field of view for that reflection sequence, as bounded by the field stops, or else the field of view itself becomes null.

If a next reflection occurs on the $n^{th}$ wall bounded by the $m^{th}$ and $(m+1)^{th}$ endpoints, an incident ray must strike the wall within the bounded interval defined as the intersection:

$$(\phi_L'', \phi_R'') = (\min(\phi_m, \phi_{m+1}), \max(\phi_m, \phi_{m+1})) \cap (\min(\phi_L', \phi_R'), \max(\phi_L', \phi_R'))$$

Here min and max designate the minimal and maximal elements of the ordered pair. $\phi_m$ and $\phi_{m+1}$ designate the azimuth angles of the $m^{th}$ and $(m+1)^{th}$ endpoints, respectively, $\phi_L'$ and $\phi_R'$ represent the reflections of the field stops for the prior reflection on the $n^{th}$ wall. It will be shown that the order of the new left and right field stops will sometimes, but not always, be inverted between left and right upon reflection. (Refer ahead to FIG. 9.) This makes the max and min functions necessary for each recursive step in the above equation.

The reflected image of the target from the plane of surface 1 of both FIGS. 6 and 7 poses a complication because it is it is not directly observable by the sensor since both the image of the target and the sensor lie on the same (nonreflecting)

side of the surface so that no ray path exists that connect the target and sensor. A ray path terminating at the target and sensor is a necessary and sufficient condition for a reflection from a plane to be directly observable. Furthermore, only those reflections for which the image and viewpoint lie on the same side of a reflecting plane can be directly observed. Nevertheless, the image could be indirectly observed with an additional reflection off the plane of surface 3, because the new image $\vec{T}''$ of $\vec{T}'$ is directly observable. A comprehensive search of all possible sequential reflections must include such images that cannot be observed directly. However, field stops can be assessed only for directly observable reflections because the position of the viewpoint is unknown for reflections that are not directly observable FIG. 7 illustrates how the reflections of endpoints $\vec{V}_1$ and $\vec{V}_2$ off the plane of surface 3, labeled as $\vec{V}_1'$ and $\vec{V}_2'$ respectively, serve as the field stops for this reflection sequence designated as (1, 3). That is because the subtense defined by the azimuth angle of vertices $\vec{V}_1'$ and $\vec{V}_2'$ limit the field of view, as expressed by the following equality:

$$(\phi_1', \phi_2')=(\phi_1', \phi_2') \cap (\phi_4, \phi_3)$$

Figure 8:
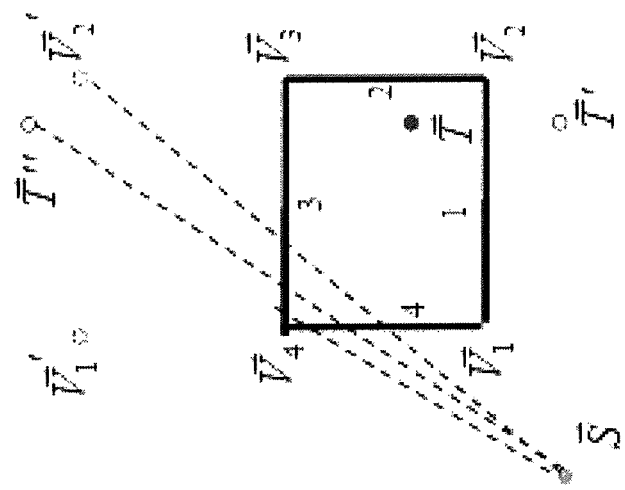
FIG. 8 illustrates how the choice of field stops depends upon the location of the viewpoint of perspective.

Clearly the choice of field stops depends upon perspective, as FIG. 8 shows. The sensor perspective is moved to the left, so that endpoint $\vec{V}_4$ and the image $\vec{V}_2'$ limit the field of view. For this case the following equality holds:

$$(\phi_4, \phi_2')=(\phi_1', \phi_2') \cap (\phi_4, \phi_3)$$

Figure 9:
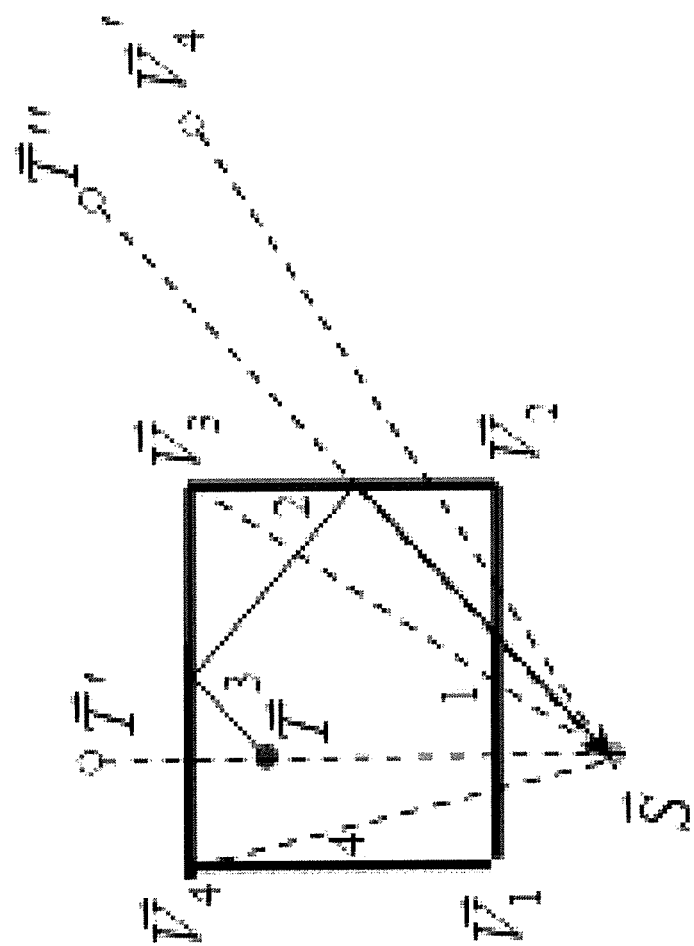
FIG. 9 illustrates how the order of the pair of field stop points can be inverted from left to right and from right to left upon reflection.

FIG. 9 illustrates how the order of the field stops is sometimes inverted between left and right upon reflection. Here, the target at location $\vec{T}$ is reflected first off surface 3 with image $\vec{T}'$ and field stops, in counterclockwise order of $\vec{V}_4$ and $\vec{V}_3$ having azimuth angles with respect to the sensor of $\phi_4$ and $\phi_3$ respectively. The first image is in turn reflected off surface 2 creating a new image located at $\vec{T}''$ with field stops in counterclockwise order at $\vec{V}_3'$ and $\vec{V}_4$ and azimuth angles of $\phi_3$ and $\phi_4'$ respectively. Note that $\vec{V}_3$ and its reflection $\vec{V}_3'$ off surface 2 are collocated. For the first reflection, $\vec{V}_3$ serves as the right field stop, while for the second reflection, it serves as the left. For the first reflection, $\vec{V}_4$ serves as the left field stop, while for the second reflection, $\vec{V}_4'$ serves as the right.

Figure 10:
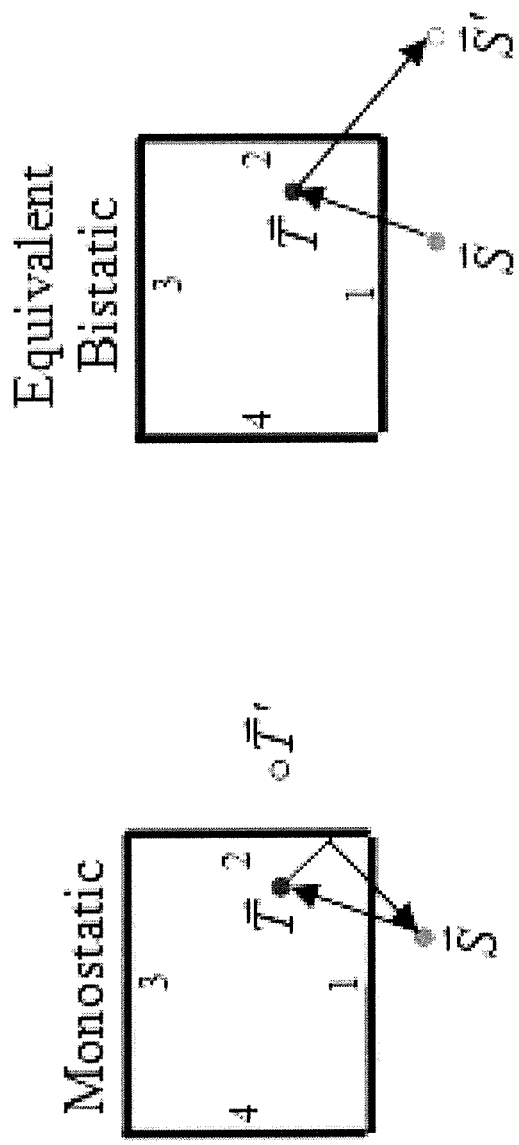
FIG. 10 illustrates how for every monostatic multipath, there exists an equivalent bistatic configuration.
Figure 11:
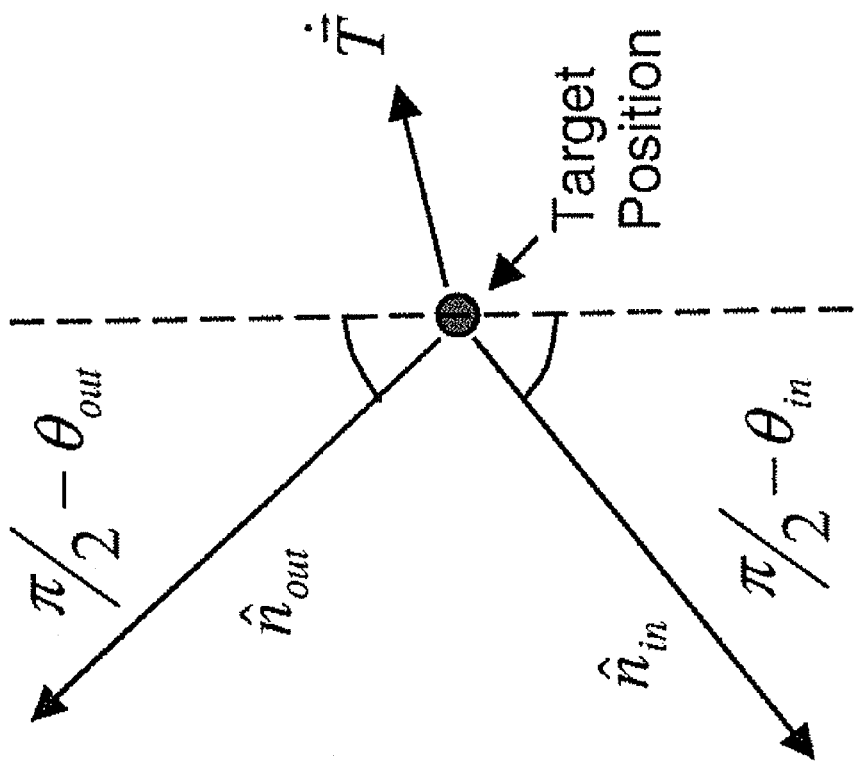
FIG. 11 illustrates how the equivalent bistatic configuration facilitates the Doppler term calculation.

The Doppler velocity term is most easily calculated by imaging the sensor from the perspective of the target for both the received and transmitted ray path. The two sensor images, one for each path, along with the target create an equivalent bistatic configuration. Refer to FIG. 10 for an example of the equivalent bistatic configuration for a direct path from the sensor to the target, followed by a return reflection off the plane of surface 2. FIG. 11 shows how a Doppler term is calculated from the target velocity and unit vectors for each one-way path. The Doppler term expressed in units of speed is:

$$\Delta v = \dot{\vec{T}} \cdot (\hat{n}_{in} + \hat{n}_{out}),$$

where $\hat{n}_{in}$ is a unit vector along the transmitted path, $\hat{n}_{out}$ is a unit vector along the received path.

Implementing an MHT requires a choice of state measurement spaces. A four-dimensional state vector for a single target is defined by $T_x$, $T_y$, $\dot{T}_x$, and $\dot{T}_y$. The measurement space includes range and Doppler speed, but excludes azimuth. Azimuth is estimated through triangulation of phase-offset returns to two physically displaced channels (i.e. phase monopoles) with a much higher relative margin of error than the range and Doppler estimates. Compounding this large error, there exists an ambiguity in azimuth due to symmetry under time-reversal. Every two way path between the sensor and the target has a time-reversed conjugate that is obtained by tracing the ray backwards, and the sensor cannot distinguish a path from its conjugate. That is because the Doppler shift is equal to the derivative of that path length, and the path length and time derivative thereof do not change when the rays are traced backwards. Note that in some cases a path is its own time-reversed conjugate.

Every detected peak that exceeds a threshold is binned in measured range and Doppler, and assigned to a single discrete range-Doppler cell based upon those values. The measured azimuth of each cell with signal amplitude that exceeds a threshold will register as a detected peak. The measured location of that detection is expected to lie along an arc of radius R between the angles $\theta_{in}$ and $\theta_{out}$ from the target perspective, which when viewed from the sensor perspective produces different arc angles shown in FIG. 19. (The azimuth angles from the target and sensor perspectives should not be confused; they are related, but not identical.) The vector (R, $\Delta v$) constitutes the measurement space, with R an apparent range, defined as a mean of the two constituent one-way paths:

$$R = \frac{1}{2}(P_{in} + P_{out})$$

The constituent one-way paths are each expressed in terms of Cartesian coordinates as:

$$P_{in} = \sqrt{(S'_{in,x} - T_x)^2 + (S'_{in,y} - T_y)^2}$$

$$P_{out} = \sqrt{(S'_{out,x} - T_x)^2 + (S'_{out,y} - T_y)^2}$$

Azimuth angles associated with the one-way paths are:

$$\cos\theta_{in} = \frac{S'_{in,x} - T_x}{\sqrt{(S'_{in,x} - T_x)^2 + (S'_{in,y} - T_y)^2}}$$

$$\cos\theta_{out} = \frac{S'_{out,x} - T_x}{\sqrt{(S'_{out,x} - T_x)^2 + (S'_{out,y} - T_y)^2}}$$

Doppler speed is:

$$\Delta v = \dot{T}_x(\cos\theta_{in} + \cos\theta_{out}) + \dot{T}_y(\sin\theta_{in} + \sin\theta_{out}),$$

Based upon the above equations, partial derivatives of each of the measured quantities (R, $\Delta v$) can be calculated with respect to each element of the state vector ($T_x$, $T_y$, $\dot{T}_x$, $\dot{T}_y$). The partial derivatives of the apparent path length are:

$$\frac{\partial R}{\partial T_x} = -\frac{1}{2}(\cos\theta_{in} + \cos\theta_{out})$$

$$\frac{\partial R}{\partial T_y} = -\frac{1}{2}(\sin\theta_{in} + \sin\theta_{out})$$

$$\frac{\partial R}{\partial \dot{T}_x} = 0$$

$$\frac{\partial R}{\partial \dot{T}_y} = 0$$

The partial derivatives of the Doppler speed are:

$$\frac{\partial \Delta v}{\partial T_x} = -\dot{T}_x\left(\frac{\sin^2\theta_{in}}{P_{in}} + \frac{\sin^2\theta_{out}}{P_{out}}\right) +$$
$$\dot{T}_y\left(\frac{\sin\theta_{in}\cos\theta_{in}}{P_{in}} + \frac{\sin\theta_{out}\cos\theta_{out}}{P_{out}}\right)$$
$$\equiv c_1\dot{T}_x + c_2\dot{T}_y$$

$$\frac{\partial \Delta v}{\partial T_y} = \dot{T}_x\left(\frac{\sin\theta_{in}\cos\theta_{in}}{P_{in}} + \frac{\sin\theta_{out}\cos\theta_{out}}{P_{out}}\right) -$$
$$\dot{T}_y\left(\frac{\cos^2\theta_{in}}{P_{in}} + \frac{\cos^2\theta_{out}}{P_{out}}\right)$$
$$\equiv c_2\dot{T}_x + c_3\dot{T}_y$$

$$\frac{\partial \Delta v}{\partial \dot{T}_x} = \cos\theta_{in} + \cos\theta_{out}$$

$$\frac{\partial \Delta v}{\partial \dot{T}_y} = \sin\theta_{in} + \sin\theta_{out}$$

Therefore, an relevant part of H matrix for a stationary sensor is:

$$\frac{\partial(R,\Delta v)}{\partial(T_x,T_y,\dot{T}_x,\dot{T}_x)} = \begin{bmatrix} -\frac{1}{2}(\sin\theta_{in}+\sin\theta_{out}) & -\frac{1}{2}(\cos\theta_{in}+\cos\theta_{out}) & 0 & 0 \\ c_1\dot{T}_x+c_2\dot{T}_y & c_2\dot{T}_x+c_3\dot{T}_y & (\cos\theta_{in}+\cos\theta_{out}) & (\sin\theta_{in}+\sin\theta_{out}) \end{bmatrix}$$

The number of possible paths reflecting off multiple surfaces grows exponentially with the number of allowed reflection, which renders a brute force test of every possible path too cumbersome for real-time calculation. Here, a method of the present invention determines possible two-way multi-paths, up to N reflections, quickly enough to calculate an H matrix in an MHT.

A one-way multipath can be represented uniquely by a walk through the complete graph of n nodes ($K_n$) for N=n surfaces under consideration. FIG. 12 shows the complete graphs for N equal to 4 and 6. $K_4$ and $K_6$ have been selected because in the examples herein, the structures consist of 4 and 6 reflecting surfaces. Each numbered node represents a reflecting surface, and each node traversed in the walk represents a reflection from the designated numbered surface. The direct path contains no nodes, while a single reflection is null, i.e. has no edges.

The present method generates a set of walks from simpler walks, starting with the direct path, i.e. no nodes. The present method computes the set of observable paths much faster than a brute force combinatorial testing of all possible walks in $K_n$.

Figure 13:
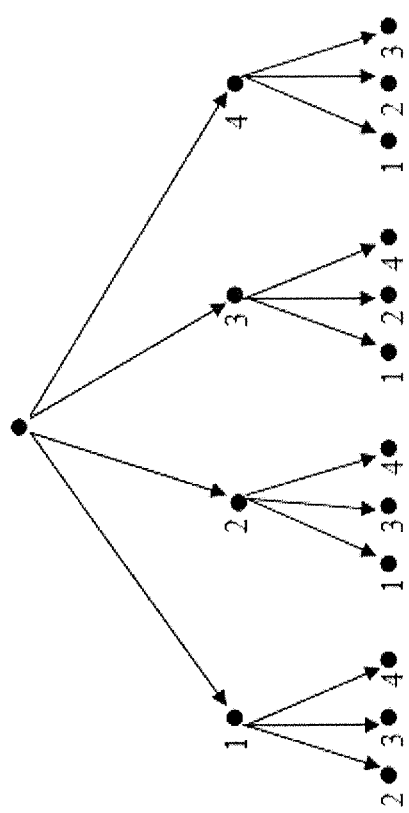
FIG. 13 illustrates a hash tree representation walks in $K_4$ for up to two reflections.

The hash tree in FIG. 13 is useful in deriving a formula for the total number of hashes representing possible one-way reflection sequences between a target and sensor. Starting with the direct path, the figure shows the number of hashes for up to two reflections. This can easily be generalized to an arbitrary number of surfaces. The initial value and recursion relationship for the total number of hashes h with up to N allowed reflections from M surfaces are:

$$h(0)=1$$

$$h(N+1)=h(N)+M(M-1)^N$$

Note that the direct path is included as the null hash. The summation evaluates to:

$$h(N) = \frac{M(M-1)^N - 2}{M-2}$$

Let h' designate the total number of hashes of two-way paths, which is a subset of the product set of one-way paths. The product set has $h^2(N)$ elements, but that set includes sequences with up to 2N reflections from surfaces. (Excluding the redundancy of time-reversed conjugates, the product set has $\frac{1}{2}h(N)(h(N)+1)$ unique elements.) However, the total number of reflections from surfaces in each two way sequence is still limited to N, as is the one-way sequence. The following equation gives h'(N) without removing the redundancy of time-reversed conjugates, and limiting the total number of reflections in the two-way path to N:

$$h'(N) = h(N) + M\sum_{n=1}^{N}(M-1)^{n-1}h(N-n)$$

Figure 14:
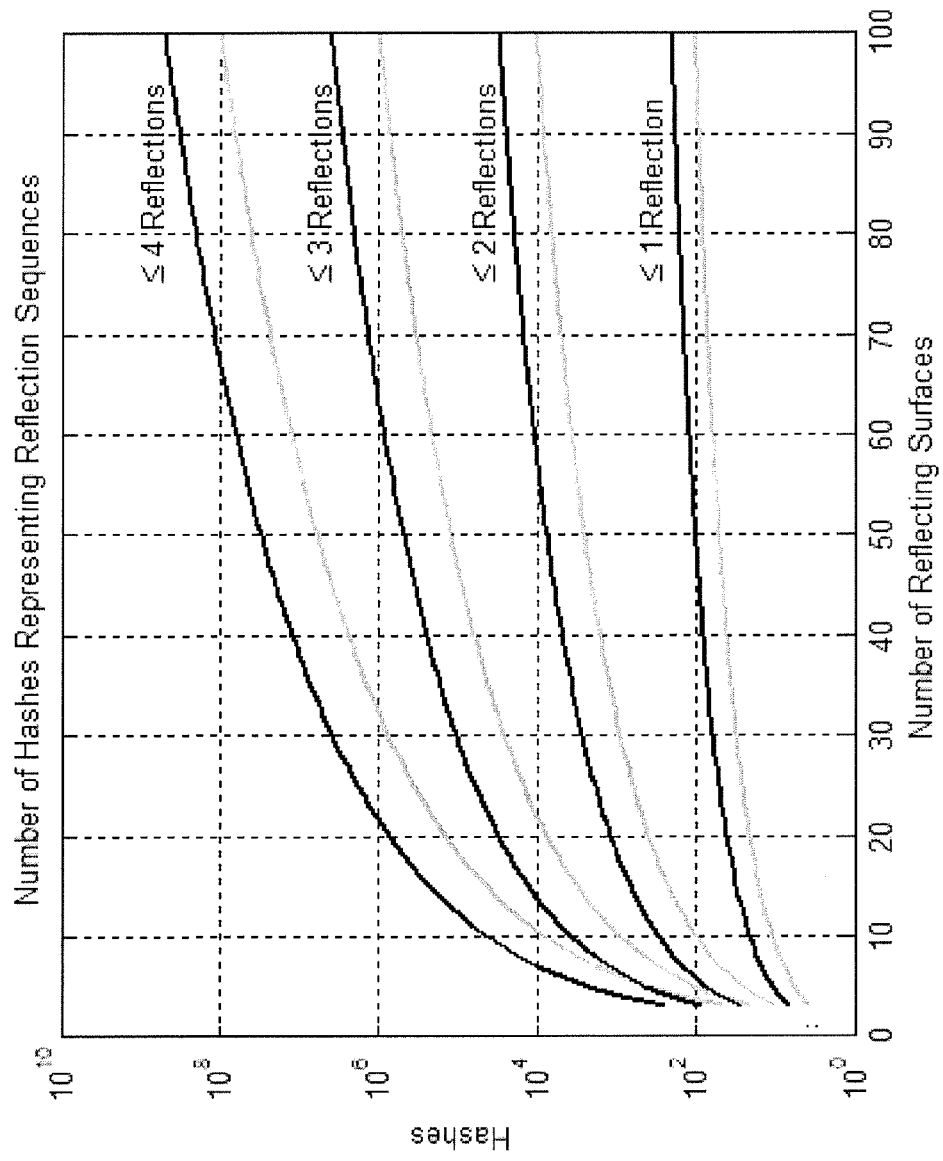
FIG. 14 graphs the total number of hashes mapping onto reflection sequences without consideration of whether those sequences are physically possible.

An approximate measure of the computational load in implementing a ray trace is the number of hashes, i.e reflection sequences that must be evaluated. FIG. 14 plots total number of possible hashes for up to four reflections. Within each pair of curves, the upper dark line represents the two-way path, and the lower lighter line represents a one-way path. The large number of hashes as illustrated the figure renders a brute force test of all possibilities impractical for a real time calculation. The number of paths allowed by the geometry, based upon the reflecting normal direction and field stop position, can be several orders of magnitude less than the number of hashes.

Figure 15:
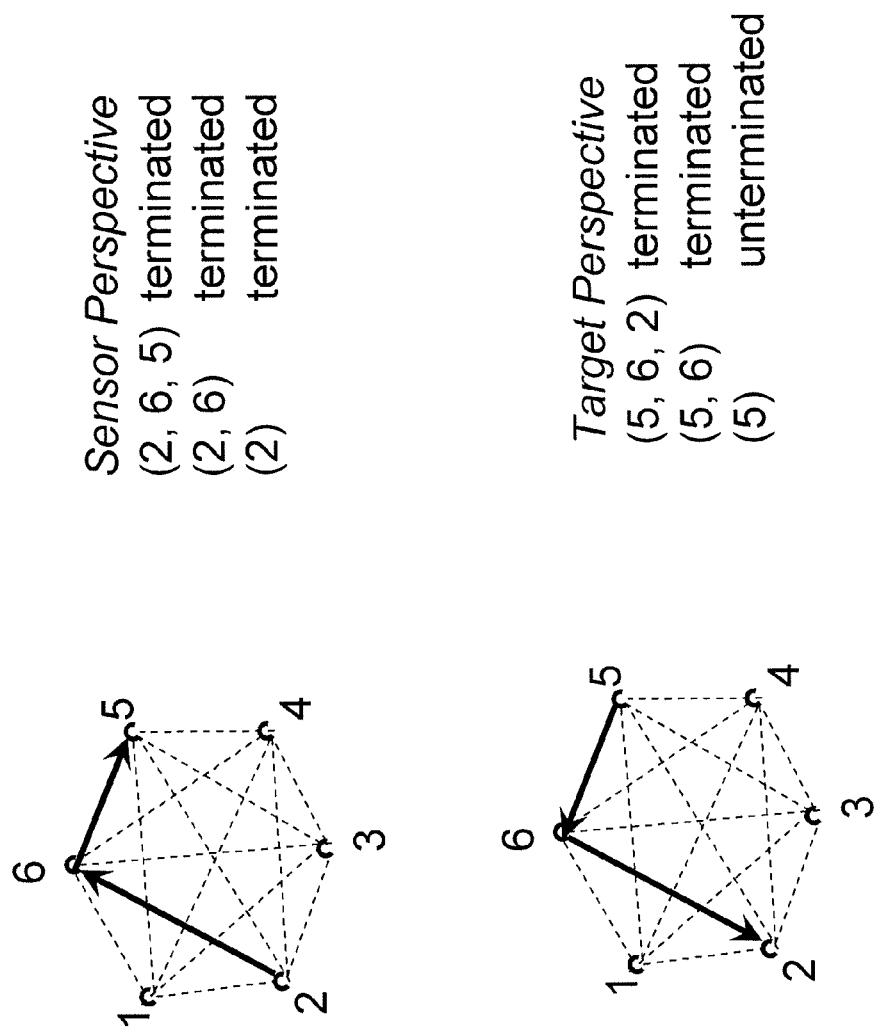
FIG. 15 illustrates that a reflection sequence is generated from a simpler sequence, and that the target and sensor perspectives are time-reversed from each other. This matches the configuration of the six surfaces of FIG. 18.
Figure 18:
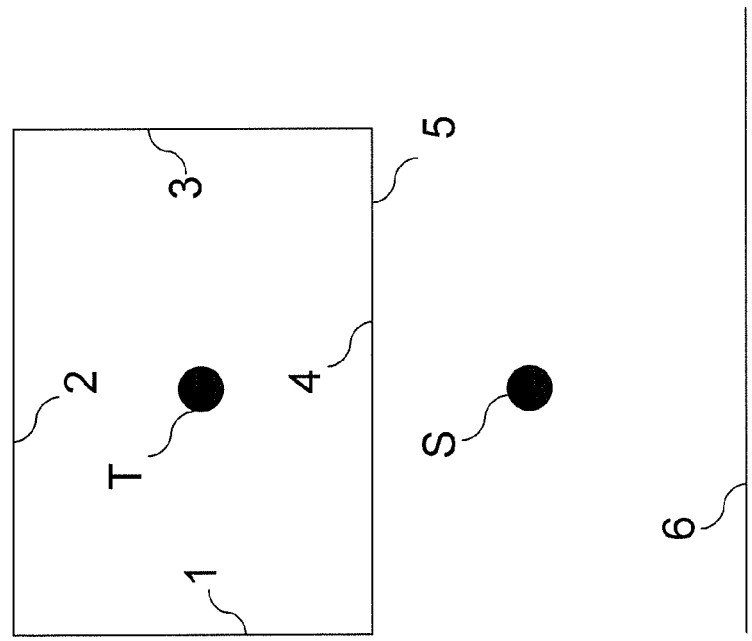
FIG. 18 illustrates an example target inside a four wall building with a back wall added behind the sensor.

FIG. 15 shows an example of a walk in $K_6$ representing a particular reflection sequence from the six surfaces of FIG. 18. As shown, each reflection sequence is generated from a simpler sequence. This means that the sequence (2,6,5) is generated by the sequence (2,6), which in turn is generated by the sequence (2). As shown, the target and sensor perspectives are each time-reversed from the other, and hence the order of reflections is reversed. The conjugate sequence from the target perspective (5,6,2) cannot be constructed from terminated sequences because the initial sequence (5) is unterminated.

Designate the recursively generated sets of all one-way physically possible terminated reflection sequences, with the symbol α, with the subscripts S and T denoting the sensor and target perspectives respectively, and the superscripted asterisk (*) denoting the time-reversed conjugate. The table below summarizes this notation.

| Set | Perspective | Time Order |
| --- | --- | --- |
| $\alpha_S$ | sensor | forward |
| $\alpha_T$ | target | forward |
| $\alpha_S^*$ | sensor | backward |
| $\alpha_T^*$ | target | backward |

Implicitly, recursion stops before a specified number of maximum reflections has been exceeded, but that limit is not explicitly indicated in this notation.

Figure 16:
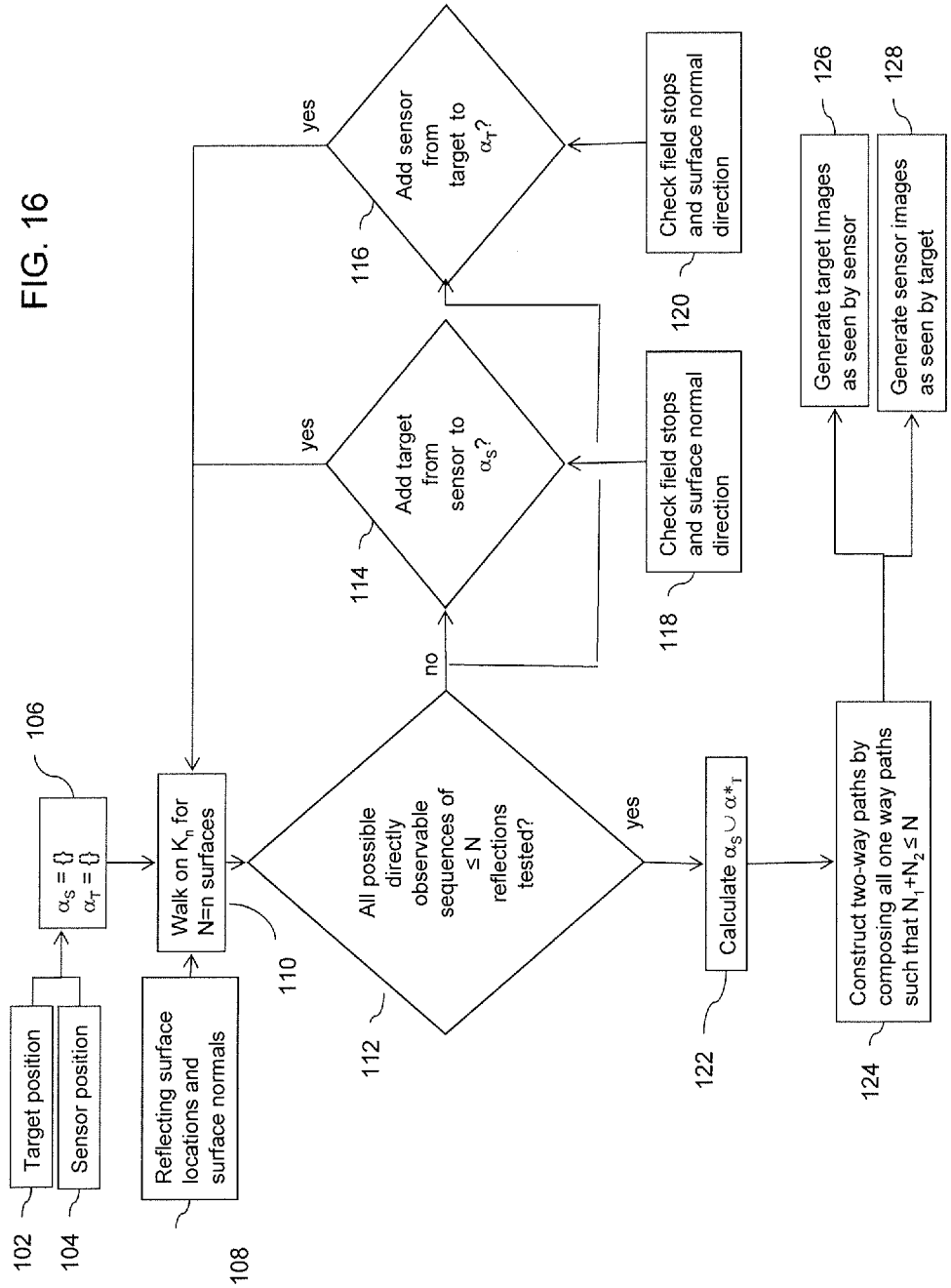
FIG. 16 illustrates the method of the present invention of identifying possible ray paths, which builds multipaths based upon simpler paths, starting with the direct path.

As shown in FIG. 16, a direct path 106 may be determined between the target position 102 and sensor position 104. The direct path 106 and reflecting surface locations and surface normal vectors 108 (e.g., parameters, such as dimensions, for each wall of the walls of the room containing the target where these parameters may function as field stops) are utilized in the determination of a set of observable reflection sequences 110. Only terminated sequences are considered. In the method of the present invention, it is determined whether all possible sequences consisting of not more than N reflections have been tested 112. If not, it is determined whether one or more sequences to the target from the sensor should be added to the set of observable reflection sequences 114, and these sequences are added if they are observable based on field stops and surface normal direction 118. Further, it is determined whether one or more sequences to the sensor from the target should be added to the set of observable reflection sequences 116, and these sequences are added if they are observable based on field stops and surface normal direction. Field stops could be determined for unterminated sequences because the viewpoint is unknown.

After all possible sequences consisting of not more than N reflections are tested 112, paths that are unterminated are eliminated 122. Two-way paths are composed from the product set of one-way paths such that $N_1+N_2 \leq N$ 124, with $N_1$ and $N_2$ the number of reflections in each of the constituent one-way paths. From here, target images as seen by the sensor may be generated 126, and sensor images as seen by the target may be generated 128.

Figure 17:
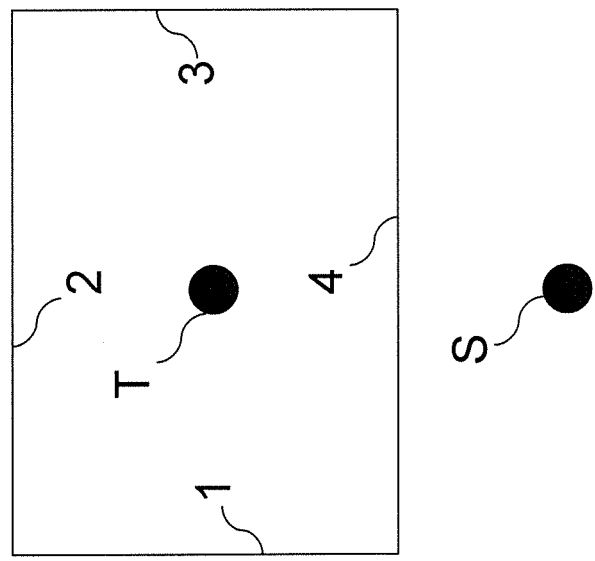
FIG. 17 illustrates a simple example of a target inside a four wall building and the sensor outside.

In the example shown in FIG. 17, a target is inside a building with four walls. The inside wall surfaces are numbered 1, 2, 3, and 4, and only inside reflections are considered. As already state, FIG. 12 shows the complete graph $K_4$ associated with 4 reflecting surfaces. In this example, up to 3 reflections are allowed. Here, a set of one-way paths to the target location at $\vec{T}$ from the viewpoint of the sensor are:

$\alpha_S = \{(2)\}$ and a set of one-way paths to the sensor from the viewpoint of the target is:

$\alpha_T = \{(2),(2,4),(2,4,2)\}$

For this example, reflections off walls 1 and 3 are not allowed because walls 1 and 3 lie outside the field of view, as defined by the finite limits of the reflecting surfaces. The time-reversed paths $\alpha_T^*$ of $\alpha_T$ are compared to $\alpha_S$. The union includes the set of reflection sequences for all terminated one-way multipaths. In this example:

$\alpha_T^* = \{(2),(4,2),(2,4,2)\}$ $\alpha_S \cup \alpha_T^* = \{(2),(4,2),(2,4,2)\}$ FIG. 18 shows another example that is similar to that shown in FIG. 18, but with the addition of a back wall 6 behind the sensor. FIG. 12 shows the associated complete graph $K_6$. First consider only the terminated multipaths, up to a total of three reflections in a sequence.

| Set | Sequences |
| --- | --- |
| $\alpha_S$ | (2) |
|  | (2, 6) |

-continued

| Set | Sequences |
| --- | --- |
|  | (2, 6, 2) |
|  | (2, 6, 5) |
|  | (6) |
|  | (6, 2) |
|  | (6, 5) |
|  | (6, 2, 6) |
| $\alpha_T$ | (2) |
|  | (2, 4) |
|  | (2, 4, 2) |
|  | (2, 6) |
|  | (2, 6, 2) |
|  | (6) |
|  | (6, 2) |
|  | (6, 2, 4) |
|  | (6, 2, 6) |
| $\alpha_T^*$ | (2) |
|  | (4, 2) |
|  | (2, 4, 2) |
|  | (6, 2) |
|  | (2, 6, 2) |
|  | (6) |
|  | (2, 6) |
|  | (4, 2, 6) |
|  | (6, 2, 6) |
| $\alpha_S \cup \alpha_T^*$ | (2) |
|  | (2, 4, 2) |
|  | (2, 6) |
|  | (2, 6, 2) |
|  | (2, 6, 5) |
|  | (4, 2) |
|  | (4, 2, 6) |
|  | (6) |
|  | (6, 2) |
|  | (6, 5) |
|  | (6, 2, 6) |

The method of the present invention might miss some physically observable multipaths for more than three one-way reflections. For example, the physically allowed path (4,2,6,5) would belong to neither $\alpha_S$ nor $\alpha_T$ because that path cannot be generated from terminated constituent paths, even though the composite path is itself terminated.

A feature of an embodiment of the present invention is that one-sided finite planar reflecting surfaces (i.e., the walls) are numbered, so that each multipath defines a unique sequence of integers, and that sequence in turn uniquely defines the path. Uniqueness follows from the requirement that reflecting surfaces all be one-sided and planar. These bounded planar surfaces can be coplanar, but coplanar surfaces with the same reflecting normal direction cannot overlap in order for the uniqueness property to hold.

Another feature of an embodiment of the present invention is that a new path is generated by adding a single allowed reflection to the end of an existing sequence. Whether a reflection is allowed is determined by finding the normal direction of the reflecting surface to be added, as well as ascertaining that the new reflected image lies within the subtense formed by the field stops (i.e., the edges of the walls). The field stops must be reevaluated with the addition of each new reflection to the sequence. In this recursive manner, all sequences are composed.

Another feature of an embodiment of the present invention is that separate reflection sequences are generated from the viewpoint of both the sensor and target.

Figure 19:
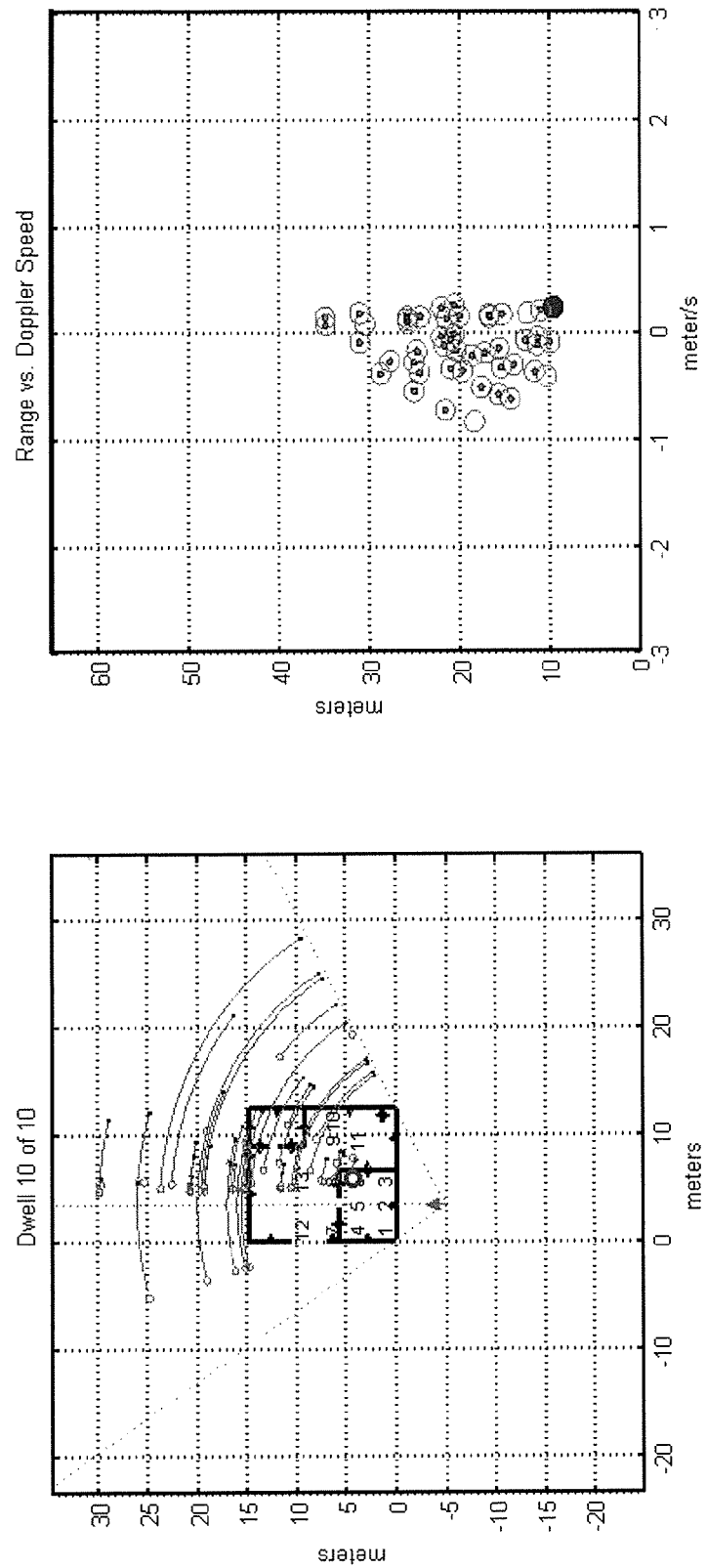
FIG. 19 illustrates x-y positions and range-Doppler plots for consecutive dwells (i.e. individual frames in an animation sequence) according to an embodiment of the present invention.

FIG. 19 illustrates a Matlab-coded implementation of a method according to an embodiment of the present invention generating animations of x-y position and range-Doppler plots for consecutive dwells (i.e. consecutive frames in the animation sequence) in the case of a building defined by 23 reflecting surfaces with a single target, where a location plot is shown on the left and a range-Doppler plot is shown on the right. For this case, the maximum number of reflections was limited to three. In the left plot, the large circle represents the target, the arrow the sensor, and the arcs represent multipaths. In the range-Doppler plot on the right, the large filled circle represents the target, and the open circles represent multipaths. Each dot inside the open circles represents a time-reversed conjugate, and if no dot is present, then the multipath is its own conjugate.

Figure 20:
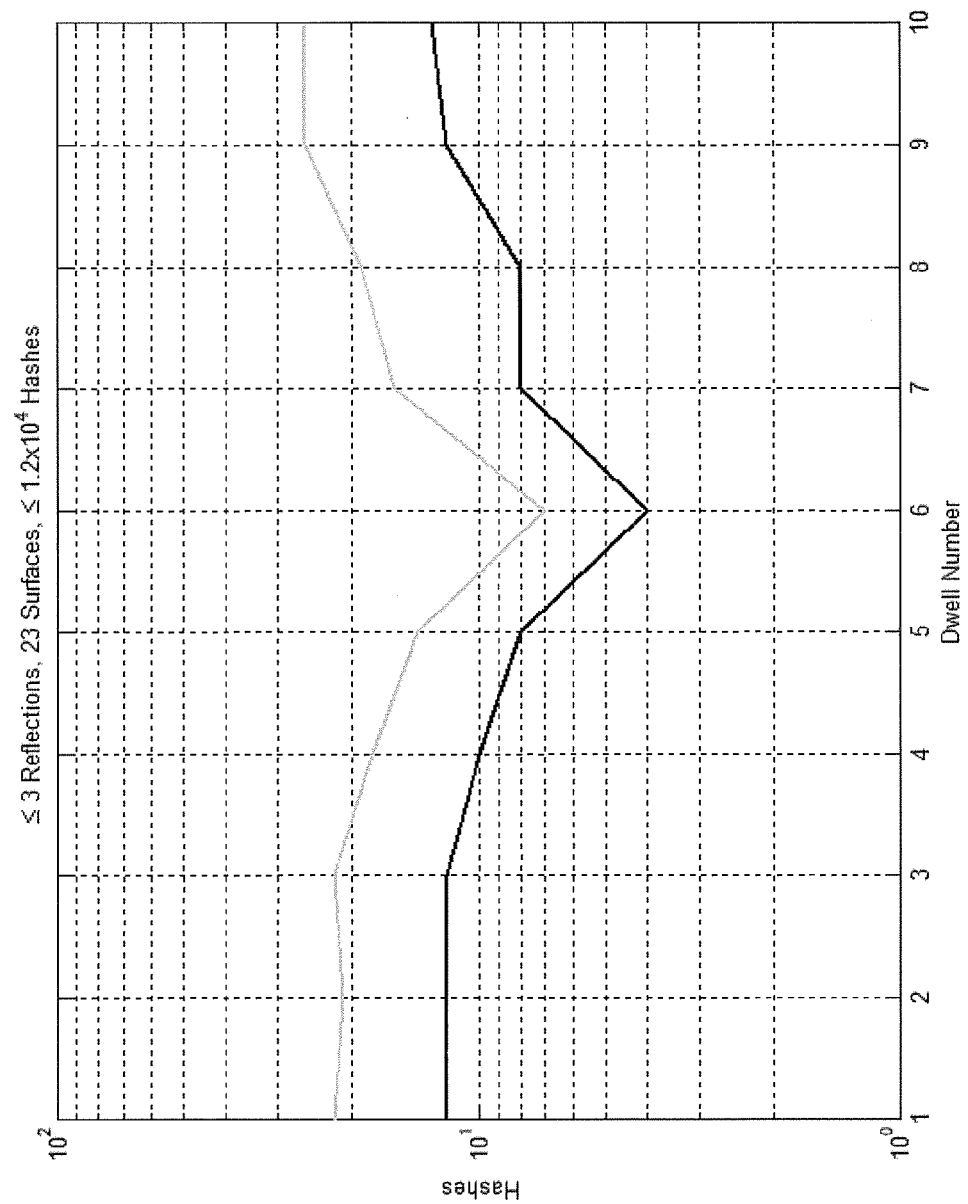
FIG. 20 plots the number of calculated hashes per dwell (upper curve) and the number of required hashes per dwell (lower curve) for the example of FIG. 19. The number of calculated hashes is generally higher than the required number due to an inherent redundancy in calculating them.

The example shown in FIG. 20 illustrates the efficiency of the method of the present invention. For a single target and 23 surfaces with a maximum of three reflections, there exist $1.2 \times 10^4$ possible hashes. However, the number of physically possible multipaths is three orders of magnitude smaller, as indicated by the plot of hashes versus dwell number. The light upper curve represents the number of hashes that the method calculated, while the lower dark curve represents the number of hashes required to represent possible multipaths. The upper light curve represents the sum of the cardinalities $|\alpha_S| + |\alpha_T|$, while the lower dark curve represents the cardinality of the union $|\alpha_S \cup \alpha_T^*|$.

Although the present invention has been described and illustrated in respect to exemplary embodiments, it is to be understood that it is not to be so limited, and changes and modifications may be made therein which are within the full intended scope of this invention as hereinafter claimed.

What is claimed is:

1. A method of detecting a target in a room using a radar system having a transmitter for irradiating the object, a sensor for receiving reflected radiation, and circuitry for analyzing the reflected radiation to determine at least one characteristic thereof, the method comprising:
    determining at least one parameter for each wall of a plurality of walls of a room containing the target;
    determining possible signal paths between the target and the sensor for paths comprising up to N reflections based on the at least one parameter of the walls and the location of the sensor, comprising:
        determining a first set of possible signal paths from the target to the sensor;
        determining a second set of time-reversed possible signal paths from the sensor to the target; and
        determining the possible two-way signal paths based on a union of the first set and the second set; and
    calculating sensor image locations based on the possible signal paths; and
    processing the received radiation to determine a target location based on the sensor image locations.

2. The method of claim 1, wherein the calculating of the sensor image locations further comprises calculating the azimuth angle and the range of the sensor image location.

3. The method of claim 1, wherein two endpoints define the dimensions and reflecting normal of each one-sided reflecting surface of the projection of a wall of the plurality of walls.

4. The method of claim 1, wherein the edges of each wall of the plurality of walls are field stops.

5. The method of claim 1, wherein the determining the possible signal paths further comprises:
    determining the possible two-way signal paths based on an intersection of the first set and the second set.

6. The method of claim 5, wherein the determining the possible signal paths further comprises:
    determining the possible two-way signal paths based on a symmetric difference of the intersection and the union.

7. The method of claim 1, wherein the processing the received radiation to determine a target location based on sensor image locations comprises calculating a Kalman filter H matrix.

8. The method of claim 1, wherein the method is performed in an MHT.

9. A method of detecting a target in a room using a radar system having a transmitter for irradiating the object, a sensor for receiving reflected radiation, and circuitry for analyzing the reflected radiation to determine at least one characteristic thereof, the method comprising:
    determining at least one parameter for each wall of a plurality of walls of a room containing the target;
    determining possible signal paths between the target and the sensor for paths comprising up to N reflections based on the at least one parameter of all of the walls and the location of the sensor;
        determining a first set of possible signal paths from the target to the sensor;
        determining a second set of time-reversed possible signal paths from the sensor to the target; and
        determining the possible two-way signal paths based on an intersection of the first set and the second set; and
    calculating sensor image locations based on the possible signal paths; and
    processing the received radiation to determine a target location based on the sensor image locations.

10. The method of claim 9, wherein the determining the possible signal paths further comprises:
    determining a union of the first set and the second set; and
    determining the possible two-way signal paths based on a product set.

11. The method of claim 9, wherein the calculating of the sensor image locations further comprises calculating the azimuth angle and the range of the sensor image location.

12. The method of claim 9, wherein the at least one parameter comprises the dimensions of each wall of the plurality of walls.

13. The method of claim 9, wherein the edges of each wall of the plurality of walls are field stops.

14. The method of claim 9, wherein the processing the received radiation to determine a target location based on sensor image locations comprises calculating a Kalman filter H matrix.

15. The method of claim 9, wherein the method is performed in an MHT.

* * * * *